United States Patent [19]

Nakatsuka et al.

[11] Patent Number: 5,300,473
[45] Date of Patent: Apr. 5, 1994

[54] RECORDING MATERIAL COMPRISING CRYSTAL OF FLUORAN COMPOUND

[75] Inventors: Masakatsu Nakatsuka; Atsuo Otsuji; Kiyoharu Hasegawa, all of Yokohama; Kazuyoshi Kikkawa; Akihiro Yamaguchi, both of Kamakura, all of Japan

[73] Assignee: Mitsui Toatsu Chemicals, Inc., Tokyo, Japan

[21] Appl. No.: 28,911

[22] Filed: Mar. 8, 1993

Related U.S. Application Data

[62] Division of Ser. No. 757,160, Sep. 10, 1991, Pat. No. 5,210,221.

[30] Foreign Application Priority Data

Sep. 17, 1990 [JP] Japan .................. 2-243713
Nov. 8, 1990 [JP] Japan .................. 2-301073

[51] Int. Cl.$^5$ .................. B41M 5/30; B41M 5/32
[52] U.S. Cl. .................. 503/221; 503/222
[58] Field of Search .................. 503/221, 222

[56] References Cited

U.S. PATENT DOCUMENTS

| | | | |
|---|---|---|---|
| 5,017,710 | 5/1991 | Igaki et al. | 549/226 |
| 5,110,952 | 5/1992 | Harada et al. | 549/226 |
| 5,187,143 | 2/1993 | Watanabe et al. | 503/212 |
| 5,200,210 | 4/1993 | Tsuchida et al. | 503/210 |
| 5,206,209 | 4/1993 | Minami et al. | 503/209 |

FOREIGN PATENT DOCUMENTS

| | | |
|---|---|---|
| 0180643 | 5/1986 | European Pat. Off. . |
| 54-34909 | 3/1979 | Japan . |
| 60-35053 | 4/1984 | Japan . |
| 59-65053 | 4/1984 | Japan . |
| 60-47066 | 3/1985 | Japan . |
| 60-141762 | 7/1985 | Japan . |
| 2154597 | 9/1985 | United Kingdom . |

OTHER PUBLICATIONS

Patent Abstracts of Japan, vol. 9, No. 160 (Jul. 4, 1985).

*Primary Examiner*—Richard L. Raymond
*Attorney, Agent, or Firm*—Millen, White, Zelano, & Branigan

[57] ABSTRACT

Disclosed are a crystal of a fluoran compound having the formula comprising exhibiting high peaks at diffraction angles (2θ) of 7.5° and 17.0° and relatively high peaks at diffraction angles (2θ) of 15.1°, 19.1°, 21.5° and 25.3° in an X-ray diffraction diagram by the CU-Kα beam and a crystal of a fluoran compound having the formula (II) comprising exhibiting high peaks at diffraction angles (2θ) of 5.5° and 19.2° in an X-ray diffraction diagram by the CU-Kα beam, which is useful as a color forming compound in recording materials.

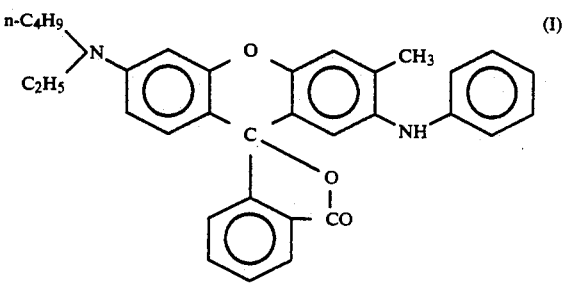

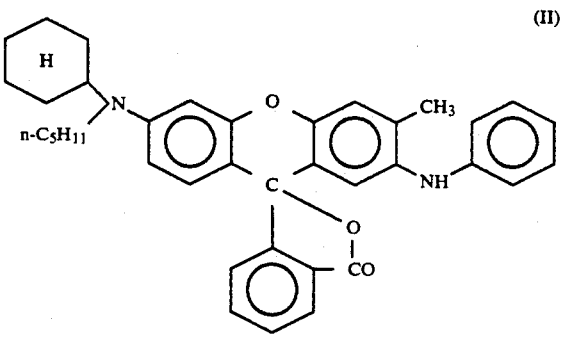

4 Claims, 3 Drawing Sheets

RECORDING MATERIAL COMPRISING CRYSTAL OF FLUORAN COMPOUND

This is a division of application Ser. No. 07/757,160 filed Sep. 10, 1991, now U.S. Pat. No. 5,210,221.

BACKGROUND OF THE INVENTION

1. Field of the Invention

The present invention relates to a fluoran compound which is useful as color forming compound in recording materials such as a pressure-sensitive recording material and heat-sensitive recording materials. More particularly, the invention relates to a crystal of the fluoran compound, isolation process of said crystal, and recording materials comprising said crystal.

2. Description of the Related Art

Pressure-sensitive recording, heat-sensitive recording and electroheat-sensitive recording have conventionally been used as systems for recording transfered information through the mediation of external energy, such as pressure, heat or electricity by utilizing color reaction between a colorless or pale colored electron donor compound (color forming compound) and an organic or inorganic electron acceptor (developer).

In these systems, fluoran compounds have widely been used as the color forming compound.

The fluoran compound having the formula (I):

is disclosed as a color forming compound in Japanese Laid-Open Patent SHO 59-65053(1984), 60-47066(1985) and 60-141762(1985). The compound is described in these patent publications to have a melting point of about 180° C. (181.2 to 182.6° C. in Japanese Laid-OPen Patent SHO 59-65053, 177 to 178° C. in 60-47066, and 178 to 180° C. in 60-141762).

The crystal of the fluoran compound represented by the formula (I) is difficult to ground, requires a long time for pulverization and leads to a problem that a dispersion of the color forming compound for the heat-sensitive recording material is difficult to prepare.

When the crystal of the fluoran compound represented by the formula (I) and having the stated melting point is used as a color forming compound of a recording material, for example, a heat-sensitive recording material using bisphenol A as a developer, the compound leads to a high color-developing temperature of the recording material and is unsatisfactory for use in high speed recording which is desired today.

Japanese Laid-open Patent SHO 54-34909(1979) discloses only the compound having the formula (II). However, no description is found at all on the properties of the compound. Japanese Laid-Open Patent SHO 60-35053(1985) practically discloses the compound of the formula (II):

The crystal of the fluoran compound having the formula (II) prepared 5Y the Process described in Japanese Laid-Open Patent SHO 60-35053(1985) is also difficult to ground, requires a long time for pulverization and has a problem that a dispersion of color forming compound for use in the heat-sensitive recording material is difficult to prepare.

Further, the crystal of fluoran compound having the formula (II) isolated by the process described in Japanese Laid-Open Patent SHO 60-35053 is poor in light stability and has a disadvantage of quick yellowing by irradiation of light.

Consequently, in cases where the crystal is used, for example, for a color forming compound of the heat-sensitive recording paper, the crystal has a disadvantage that the uncolored portion of the resulting paper causes yellowing by light irradiation, and serious problems have frequently occurred in practical use.

SUMMARY OF THE INVENTION

An object of the present invention is to improve disadvantages of the fluoran compounds having the formula (I) and formula (II) in use as the color forming compound in recording materials and to provide a novel crystal type of the fluoran compounds having the formula (I) and formula (II) which has excellent properties for use in the heat- and pressure-sensitive recording materials, heat-sensitive recording material in particular.

As a result of an intensive investigation on the compounds of the formula (I) and formula (II) in order to improve the above disadvantages, the present inventors have found that a novel crystal type which differs from a conventionally known crystal type exists in the fluoran compounds of the formula (I) and formula (II), and that the novel crystal type of the fluoran compounds has excellent properties as a color forming compound for use in the pressure-and heat-sensitive recording materials.

That is, the aspect of the invention is a crystal of a fluoran compound which is characterized by an X-ray diffraction diagram exhibiting high peaks at diffraction angles ($2\theta$) of 7.5° and 17.0° and relatively high peaks at 15.1°, 19.1°, 21.5° and 25.3° in the x-ray diffraction method by the CU-K$\alpha$ beam, and which has the formula (I):

(I)

Another aspect of the invention is a crystal of the fluoran compound which is characterized by an X-ray diffraction diagram exhibiting high peaks at diffraction angles (2θ) of 5.5° and 19.2° in the X-ray diffraction method by the Cu-Kα beam, and which has the formula (II):

(II)

Further aspects of the invention are preparation processes of said crystals and recording materials comprising said crystals.

The novel crystal type of the fluoran compound having the formula (I) and formula (II) of the present invention has excellent properties as a color forming compound in recording materials as compared with conventionally known crystal types.

BRIEF DESCRIPTION OF THE DRAWINGS

In each drawing, the axis of abscissa indicates a diffraction angle (2θ) and the axis of ordinate indicates strength of diffraction.

In the drawing, the curve(a) illustrates the color density characteristic of Type I -a crystal and the curve(b) illustrates that of Type I -b crystal, respectively.

DETAILED DESCRIPTION OF THE INVENTION

The fluoran compound having the formula (I) is prepared by reacting the benzoic acid derivative of the formula (II):

(III)

with a diphenylamine derivative represented by the formula (TV):

(IV)

wherein R is a lower alkyl group having from 1 to 4 carbon atoms.

The fluoran compound having the formula (II) is prepared by reacting the benzoic acid derivative of the formula (V):

(V)

with a diphenylamine derivative represented by the formula (IV).

The reaction is carried out in the presence of dehydrating condensation agents such as concentrated sulfuric acid, a mixture of sulfuric acid and fuming sulfuric acid, polyphosphoric acid, phosphorus pentoxide and anhydrous aluminium chloride, preferably in concentrated sulfuric acid in particular. The resulting reaction mixture is made alkaline to obtain the fluoran compound.

The dehydrating condensation reaction is usually carried out at a temperature of 0° to 100° C. for several to 100 hours. When the reaction is carried out in concentrated sulfuric acid, the reaction temperature is preferably 0° to 50° C. in particular. The reaction is continued for sufficient time because the reaction time depends upon the reaction temperature.

After finishing the dehydrating condensation reaction, alkali treatment is preferably carried out in a temperature range of 0° to 100° C. by adjusting the reaction mixture to PH 9 to pH 12 with an aqueous potassium hydroxide solution or aqueous sodium hydroxide solution. The alkali-treatment can also be conducted in the presence of organic solvents such as benzene and toluene.

The crystal of the fluoran compound of the present invention belongs to a novel crystal type of the fluoran compounds formed by the above reaction and having the formula (I) and formula (II).

The crystal of the fluoran compound having the formula will be illustrated in detail.

The crystal of the fluoran compound having the formula (I) can be prepared by crystallizing said fluoran compound from a solution which consists of the fluoran compound of the formula (I) obtained by the above reaction and an organic solvent containing 30 % by weight or more of an aromatic hydrocarbon solvent, and successively by isolating the precipitated crystal.

Exemplary aromatic hydrocarbon solvents which can be preferably used include a single compound or a mixture selected from benzene, toluene, xylene, ethylbenzene, chlorobenzene and dichlorobenzene.

The aromatic hydrocarbon solvents can also be used as a mixture with other organic solvents, for example, alcohol solvents such as methanol, ethanol, propanol and butanol; ketone solvents such as acetone and methyl ethyl Ketone; ether solvents such as tetrahydrofuran and dioxane; and polar solvents such as acetonitrile and dimethylformamide.

In cases where the aromatic hydrocarbon solvent is used as a mixture with other organic solvents, for example, crystallization of the fluoran compound having the formula (I) from a solvent mixture composed of 20 % by weight of toluene and 80 % by weight of methanol forms another crystal type, i.e., type I -b crystal described below. In order to prepare a crystal of the invention the content of the aromatic hydrocarbon solvent in the solvent mixture is preferably 30 % by weight or more, more preferably 40 % by weight or more.

The amount of organic solvent containing 30 % by weight or more of the aromatic hydrocarbon solvent is preferably 0.4 part by weight or more per part by weight of the fluoran compound having the formula (I). When the aromatic hydrocarbon solvent is used in a too small amount, the fluoran compound having the formula (I) does not crystalize in some cases and precipitates in the amorphous state.

On the other hand, no particular problem occurs by use of a large amount of said solvent. However, the large amount is unfavorable in view of economy or because of concentration procedure required for precipitating the crystal. The amount of the solvent is preferably 0.4 to 100 parts by weight, more preferably 0.5 to 50 parts by weight per part by weight of the fluoran compound having the formula (I).

Precipitation of the crystal is frequently carried out by completely dissolving the fluoran compound in the solvent and successively cooling the resultant solution. In the precipitation process, the fluoran compound can be completely dissolved by heating the solvent from the room temperature to the boiling point of the solvent, if desired. The completely dissolved solution is successively cooled with stirring or allowed to cool to precipitate the crystal.

Further, in the preparation process of the fluoran compound having the formula (I) the crystal of the fluoran compound can also be prepared by carrying out the alkali treatment after the dehydrating condensation reaction in the presence of the aromatic hydrocarbon solvent and thereafter by precipitating the dissolved fluoran compound of the formula from said solvent in the form of crystal.

No particular means is required for the isolation of the precipitated crystal. By conventionally known methods, for example, by filtration and successive drying at a temperature lower than the melting point of the fluoran compound, the crystal of the fluoran compound having the formula (I) in the invention can be obtained.

The thus-obtained fluoran compound having the formula in the invention provides an X-ray diffraction diagram (FIG. 1) exhibiting high peaks at diffraction angles ($2\theta$) of 7.5° and 17.0°, and relatively high peaks at 15.1°, 19.1°, 21.5° and 25.3° in an X-ray diffraction analysis by the Cu-K$\alpha$ beam (the crystal is hereinafter referred to as Type I -a crystal).

On the other hand, the crystal of the fluoran compound having the formula (I) which is prepared by conventionally known method, for example, precipitated from isopropanol solution, provides an X-ray diffraction diagram (FIG. 2) exhibiting high peaks at diffraction angles ($2\theta$) of 8.7° and 14.7° and relatively high peaks at 15.7° 19.1°, 20.1°, 21.4° and 22.9° (the crystal is hereinafter referred to as Type I -b crystal). (Errors of about -±0.2° are permitted in the indication of the diffraction angle.)

Figure 1:
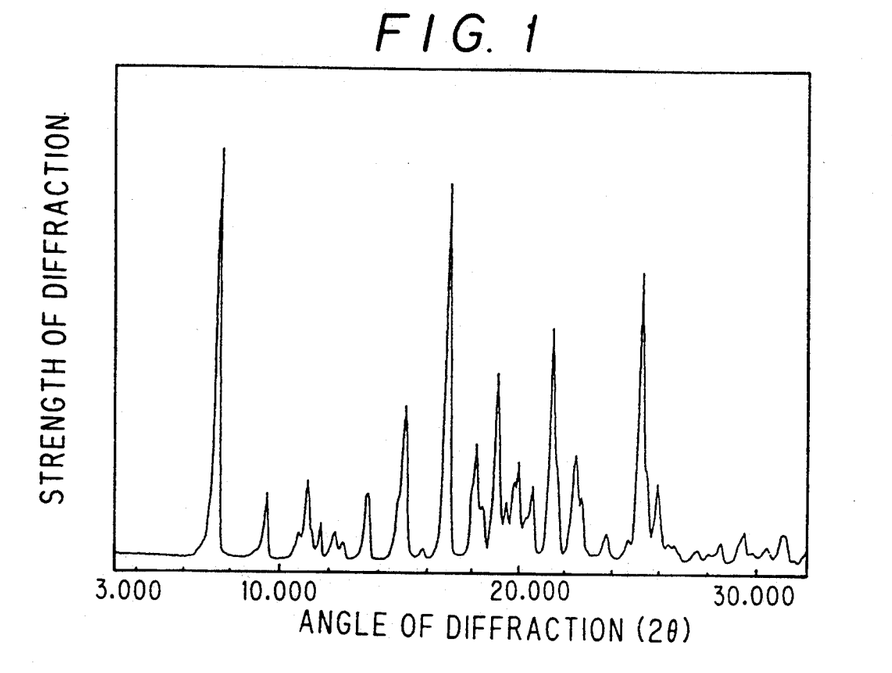
FIG. 1 is an X-ray diffraction diagram of Type I -a crystal of the invention obtained on the fluoran compound having the formula (I).
Figure 2:
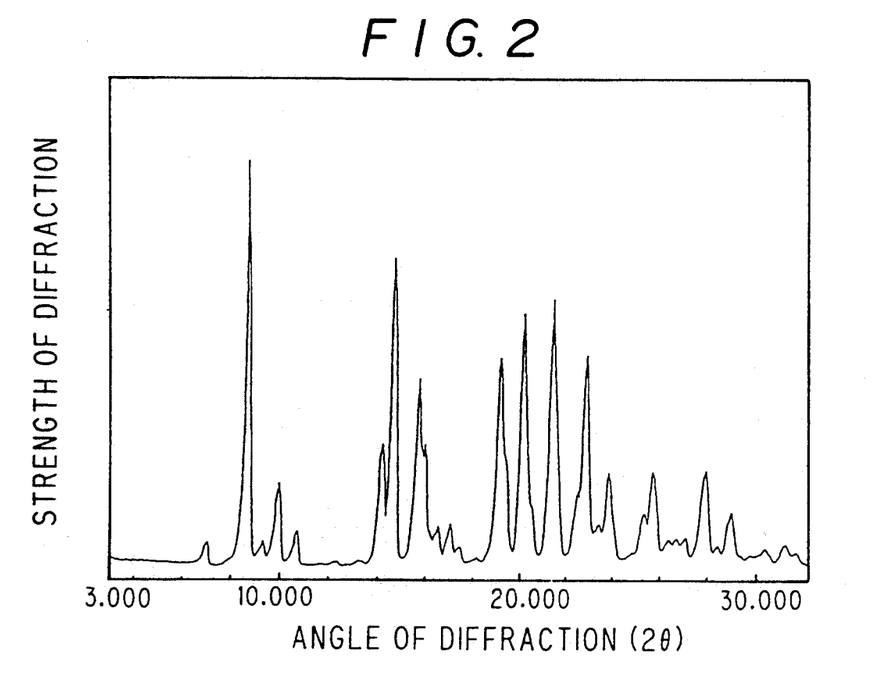
FIG. 2 is an X-ray diffraction diagram of a conventionally known Type I -b crystal obtained on the fluoran compound having the formula (I).

As clearly illustrated in the X-ray diffraction diagrams in FIG. 1 and FIG. 2, Type I -a crystal of the invention has a different crystal structure as compared with that of the conventionally known Type I -b crystal.

Type I -a crystal of the invention has a melting point of 162° to 164° C. Conventionally known Type I -b crystal has a melting point of 182° to 183° C. There is a great difference between these melting points.

Type I -a crystal of the invention can also be prepared from conventionally known Type I -b crystal. For example, Type I -b crystal is dissolved in an organic solvent containing 30 % by weight or more of an aromatic hydrocarbon solvent, precipitated in the form of crystal and isolated to obtain Type I -a crystal. In practice, Type I -b crystal is dissolved in a temperature range of from room temperature to the boiling point of the solvent in the aromatic hydrocarbon solvent such as benzene, toluene, xylene, ethylbenzene, chlorobenzene, dichlorobenzene and a mixture of these solvents, and the precipitated crystal is treated by conventional methods, for example, filtered and dried to obtain Type I -a crystal of the invention.

Type I -b crystal is obtained by crystallizing the compound having the formula (I) from a solution in isopropanol (described in Japanese Laid-Open Patent SHO 59-65053 and 60-47066) or acetonitrile.

However, it is quite unexpected and surprising that conventionally unknown Type I -a crystal of the invention can be prepared by changing the solvent to an organic solvent containing 30 % by weight or more of an aromatic hydrocarbon solvent.

Next, crystal of the fluoran compound having the formula will be illustrated.

The crystal of the fluoran compound of the formula can be prepared by crystallizing from a solution which consists of the fluoran compound having the formula (II) and an organic solvent containing 50 % by weight or more of an alcohol solvent having from 3 to 18 carbon atoms, and successively by isolating the precipitated crystal.

When the compound having the formula (II) is crystallized from an alcohol having 2 or less carbon atoms, i.e., methanol or ethanol, the resulting crystal has another crystal form which differs from the crystal of the invention, that is, Type II -b crystal described below. Consequently, the alcohols having 2 or less carbon atoms are unfavorable for the crystallization of the fluoran compound having the formula (II) of the invention.

Alcohol solvents having 3 or more carbon atoms are preferably used for crystallizing the fluoran compound of the formula (11) in the invention. However, alcohol solvents having a large number of carbon atoms are difficult to obtain or difficult to handle because of high boiling Point. Thus the alcohol solvents preferably have from 3 to 18 carbon atoms and aliphatic alcohol solvents having from 3 to 18 carbon atoms are more preferred.

Exemplary alcohol solvents having from 3 to 18 carbon atoms include, propanol, butanol, pentanol, heptanol, octanol, nonanol, decanol, undecanol, dodecanol, tridecanol, tetradecanol, pentadecanol, hexadecanol, heptadecanol and octadecanol. In the case of single use in particular, preferred alcohols are propanol, butanol, pentanol, hexanol, heptanol, octanol, nonanol, decanol, undecanol and dodecanol.

The alcohol solvents having from 3 to 18 carbon atoms can also be used in combination with other organic solvents. Useful other organic solvents include, for example, alcohol solvents such as methanol and ethanol; ketone solvents such as acetone and methyl ethyl ketone; ester solvents such as ethyl acetate and butyl acetate; ether solvents such as tetrahydrofuran and dioxane; polar solvents such as acetonitrile and dimethylformamide; and aromatic polar solvents such as benzene, toluene, the xylene and chlorobenzene. When the alcohol solvent having from 3 to 18 to carbon atoms is in a very small proportion to the solvent mixture, another type of crystal (Type II -b crystal described below) sometimes precipitates. The proportion of alcohol solvent having from 3 to 18 carbon atoms to the solvent mixture is preferably 50% by weight or more, more preferably 80 % by weight or more.

When the amount for use of the organic solvent containing 50 by weight or more of the alcohol solvent having from 3 to 18 carbon atoms is too small, the fluoran compound of the formula (II) does not crystallize in some cases and precipitates in the amorphous state. Consequently, the amount of the organic solvent is preferably about 0.4 par by weight or more per part by weight of the fluoran compound having the formula (II).

Use of a large amount of said solvent leads to no particular problem. However, in view of economy and in order to avoid concentration procedure, the solvent is used in an amount of preferably from 0.4 to 100 parts by weight, more preferably from 0.5 to 50 parts by weight per part by weight of the fluoran compound having the formula (II).

Precipitation of the crystal is frequently carried out by completely dissolving the fluoran compound in the solvent and successively cooling the resultant solution. In the precipitation procedure, the fluoran compound can be completely dissolved by heating the solvent from the room temperature to the boiling point of the solvent, if desired. The completely dissolved solution is successively cooled with stirring or allowed to cool to precipitate the crystal. No particular method is required for isolation of the precipitated crystal. Conventionally known methods, for example filtration and drying at a temperature below the melting point of the fluoran compound, can give crystallized fluoran compound having the formula (II) in the invention.

The thus-obtained crystal of the fluoran compound having the formula (II) in the invention provides an X-ray diffraction diagram (FIG. 3) exhibiting high peaks at diffraction angles $(2\theta)$ of 5.5° and 19.2° in an X-ray diffraction analysis by the Cu-K$\alpha$ beam (the crystal is hereinafter referred to as Type II -a crystal).

Figure 4:
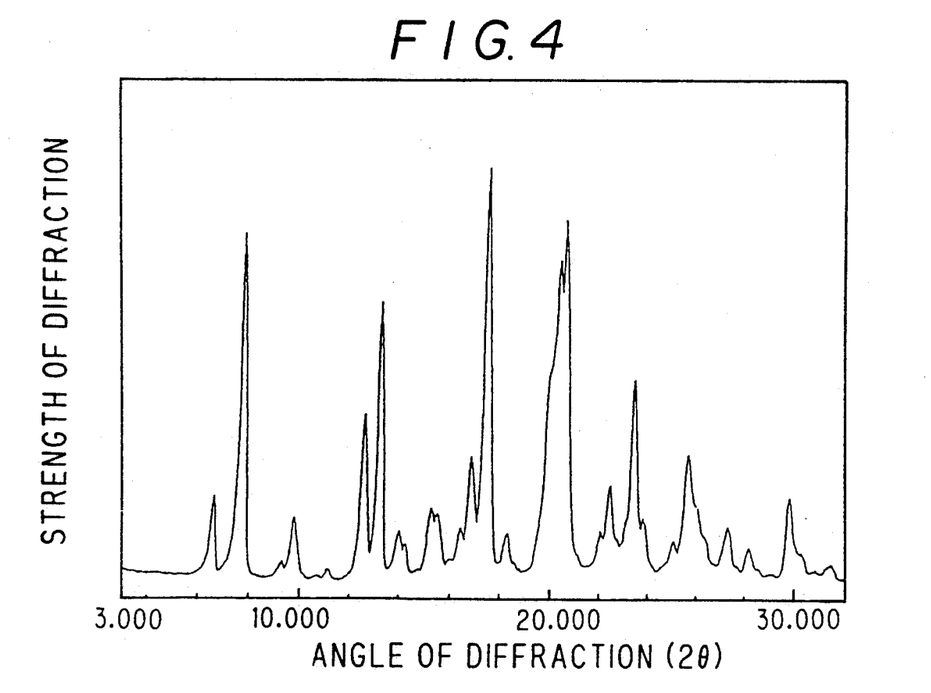
FIG. 4 is an X-ray diffraction diagram of a conventionally known Type II -b crystal obtained on the fluoran compound having the formula (II).

On the other hand, the crystal of the fluoran compound having the formula (II) which is prepared by the method described in Japanese Laid-Open Patent SHO 60-35053(1985) or isolated from methanol or ethanol solution exhibits strong peaks at diffraction angles $(2\theta)$ of 7.7°, 13.1°, 17.4°, 20.3° and 20.5° as illustrated in FIG. 4 (the crystal is hereinafter referred to as Type II -b crystal). (Errors of about ±0.2° can be permitted in the indication of a diffraction angle.)

Figure 3:
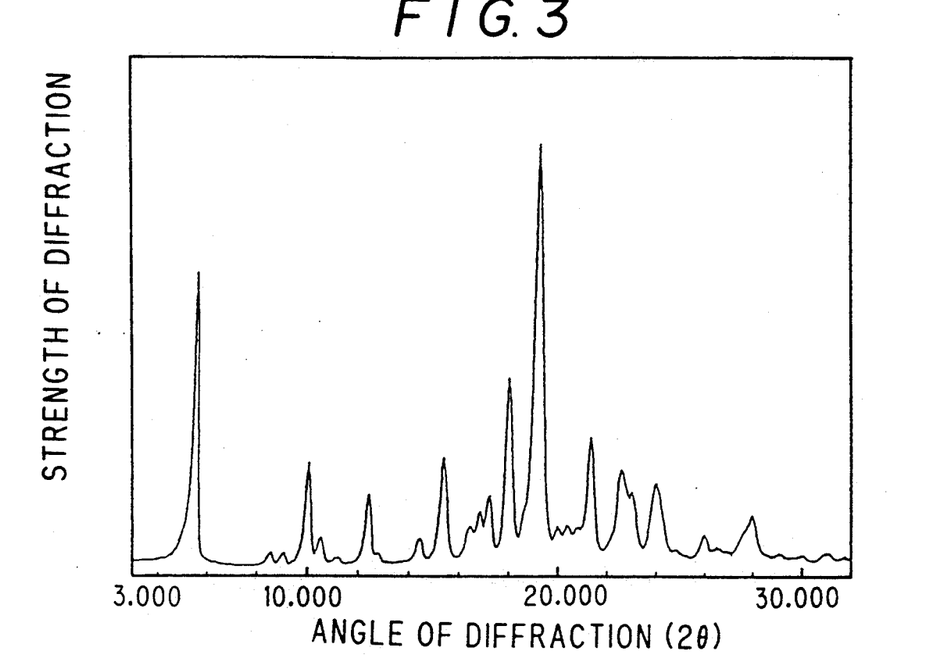
FIG. 3 is an X-ray diffraction diagram of Type II -a crystal of the invention obtained on the fluoran compound having the formula (II).

As clearly illustrated in the X-ray diffraction diagrams in FIG. 3 and FIG. 4, Type II -a crystal of the invention has a different crystal structure as compared with that of the conventionally known Type II -b crystal.

Type II -a crystal of the invention has a melting point of 168° to 171° C. Conventionally known Type II -b crystal has a melting point of 136° to 141° C. There is a great difference between these melting points.

Type II -a crystal of the invention can also be prepared from conventionally known Type II -b crystal. For example, Type II -b crystal is dissolved in an organic solvent containing 50% by weight or more of alcohol solvent having from 3 to 18 carbon atoms, precipitated in the form of crystal and isolated to obtain Type II -a crystal. In practice, Type II -b crystal is dissolved in a temperature range of from room temperature to the boiling point of the solvent in a single alcohol or a mixture of the alcohol selected from, for example, propanol, butanol, pentanol, hexanoll heptanol, octanol, nonanol, decanol, undecanol and dodecanol, and the precipitated crystal is treated by conventional methods, for example, filtered and dried to obtain Type II -a crystal of the invention.

Type II -b crystal is obtained by crystallizing the compound having the formula (II) from a solution in toluene (described in Japanese Laid-Open Patent SHO 60-35053), acetonitrile or an alcohol solvent having 2 or less carbon atoms, i.e., methanol or ethanol. However, it is quite unexpected and surprising that conventionally unknown Type II -a crystal of the invention can be prepared by changing the solvent to an organic solvent containing 50 % by weight or more of an alcohol solvent having from 3 to 18 carbon atoms.

Type I -a crystal of the fluoran compound having the as formula (I) and Type II -a crystal of the fluoran compound having the formula (II) which are prepared above in the present invention can be used as color forming compounds for various recording materials.

In these cases, the crystals can be used singly or as a mixture. Further, the crystals can also be mixed, if desired, with other color forming compounds such as triphenylmethane lactones, fluorans and spiropyranes in order to adjust hue.

The recording material of the present invention is a pressure-sensitive or a heat-sensitive recording material comprising Type I -a crystal and Type II -a crystal of the invention.

When preparing the pressure-sensitive recording material, the crystal of the fluoran compounds of the invention is dissolved in a solvent which is commonly used in the field. The solvent includes a single solvent or a mixture of the same selected from, for example, alkylbenzenes such as n-dodecylbenzene, alkylbiphenyls such as triethylbiphenyl and diisopropylbiphenyl, hydrogenated terphenyls, alkylnaphthalenes such as diisopropylnaphthalene, diarylethanes such as phenylxylylethane, and styrenated ethylbenzene, and chlorinated paraffins. The resulting solution is sealed by a coacervation method or an interfacial polymerization method into microcapsules having an external wall comprised of gelatin, melaminealdehyde resin, urea-aldehyde resin, polyurethane, polyurea, polyamide or the like. Aqueous dispersion of the microcapsules is mixed with a suitable binder such as starch paste and latex, and applied to a suitable substrate such as paper, plastic sheet or resin coated paper. The coated back sheet for pressure-sensitive recording is thus obtained.

The microcapsule dispersion thus obtained can, of course, be used to produce so-called middle-sheets wherein the microcapsule dispersion is applied to one side of a substrate and a coating liquid primarily comprising a developer is applied to the other side of the substrate, and to produce so-called self-coated sheets wherein both the microcapsules and the developer are present on the same side of a substrate.

The single copying sheet is prepared by applying a coating liquid comprising the microcapsules and the developer to one side of the substate or by applying a microcapsule dispersion to one side of the substrate and then applying a coating liquid of the developer on the coated layer of the microcapsules.

Exemplary developer suitable for use in the pressure-sensitive recording material includes copolymers of salcylic acid, phenols and aldehydes such as formaldehyde resin; alkyl, aryl or aralkyl substituted salicylic acid such as 3,5-di-α-methylbenzylsalicylic acid; polycondensate of si-,bstituted salicylic acid and styrene; alkylphenols such as octylphenol; phenol aldehyde resin, such as p-phenylphenol novolak resin; metal salts of these compounds such as zinc, magnesium, aluminum, calcium, tin and nickel salts; and activated clays.

When preparing a heat-sensitive recording material of the invention, the crystal of the fluoran compounds of the invention is pulverized in water to form aqueous dispersion. The dispersion is mixed with an aqueous dispersion of pulverized developer, and binder is added to the thus obtained mixture.

Representative examples of developers which are suitable for use in the heat-sensitive recording material include bisphenol A, halogenated bisphenol A, alkylated bisphenol A, dihydroxydiphenyl sulfone, halogenated dihydroxydiphenyl sulfone, alkylated dihydroxydiphenyl sulfone, hydroxybenzoic acid esters, hydroquinone monoethers and other phenol derivatives; organic developers such as salicylic acid derivatives, salicylamide derivatives, urea derivatives, and thiourea derivatives; and inorganic developers such as acid clay, attapulgite, activated clay, aluminum chloride and zinc bromide.

Exemplary binder used for the heat-sensitive recording material includes polyvinyl alcohol, modified polyvinyl alcohol, methylcellulose, hydroxyethylcellulose, polycarboxymethylcellulose, gum arabic, salt of styrene-maleic anhydride copolymer, and isobutyleneacrylic acid-maleic anhydride copolymer.

Other additives can also be added to the mixture thus obtained. Exemplary additives include fillers such as talc, kaolin and calcium carbonate, and if necessary, may also include sensitizers such as higher fatty acid amides, aromatic carboxylic acid esters, aromatic sulfonic acid esters, aromatic ethers, aromatic substituted aliphatic ethers, aromatic hydrocarbons, aromatic substituted aliphatic hydrocarbons and other generally known sensitizers for the heat-sensitive recording material; UV-absorbers; and defoamers.

The coating liquid obtained by the addition of the above additives can be applied to a suitable substrate such as paper, plastic sheet and resin coated paper and used as the heat-sensitive recording material. The heat-sensitive recording system of the invention can of course be used in a solvent system without any problem in place of the above aqueous dispersion system. The system of the invention can also be employed for other end use applications using color forming materials, for example, a temperature-indicating material.

Type I-a crystal of the fluoran compound having the formula (I) and Type II-a crystal of the fluoran compound having the formula (II) in the invention can be pulverized with ease as compared with conventionally known Type I-b crystal of the fluoran compound having the formula (I) and Type II-b crystal of the fluoran compound having the formula (II).

Particularly, coating liquid of the color forming compound for the heat-sensitive recording material can be prepared within a short time. Thus, the crystals of the invention have very excellent characteristics in industry.

Each 10 of Type I-a crystal and Type II-a crystal of the invention and conventional known Type I-b crystal and Type II-b crystal were individually, mixed with 50 g of 2 wt. % polyvinyl alcohol and treated in a sand grinder by using 60 9 of glass beads having a diameter of 1 mm. The time required for grinding each crystal to an average particle size of 1.5 μm was compared.

Results are illustrated in Table 1.

TABLE 1

| Crystal type | Time (hr) |
| --- | --- |
| Type I-a crystal | 3 |
| Type II-a crystal | 3 |
| Type I-b crystal | 6 |
| Type II-b crystal | 5.5 |

As clearly illustrated in Table 1, Type I-a crystal and Type II-a crystal of the invention can be pulverized in about a half time as compared with conventionally known Type I-b crystal and Type II-b crystal.

Figure 5:
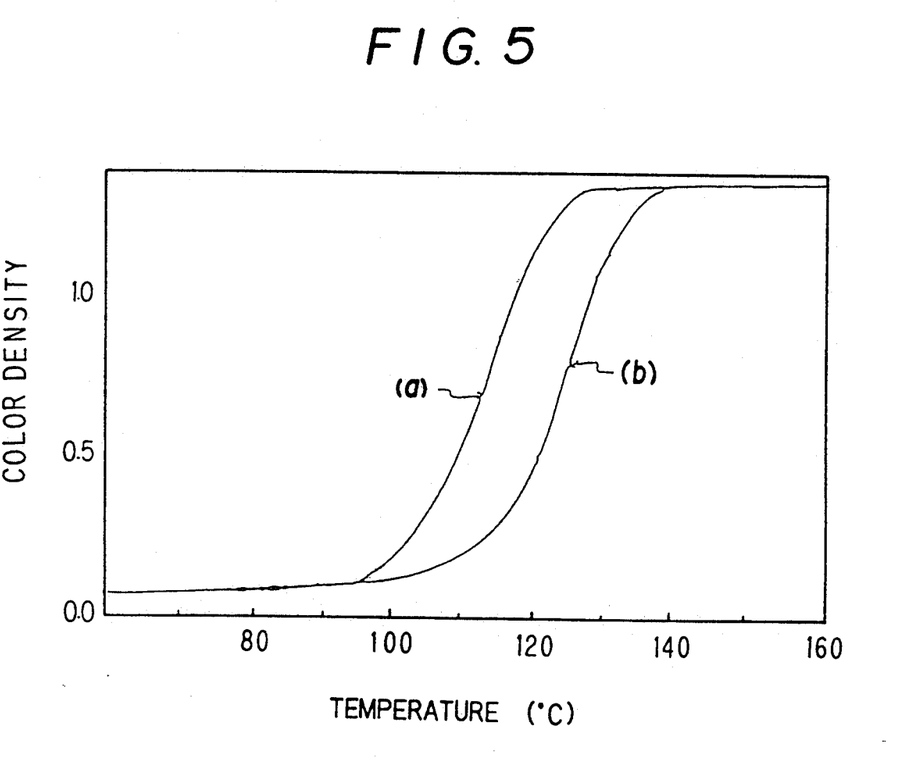
FIG. 5 illustrates relationships between color density characteristics and temperature on the heat-sensitive recording papers prepared by using Type I -a crystal of the invention and the conventionally known Type I -b crystal, respectively.

A heat-sensitive recording paper was prepared by using the Type I-a crystal of the fluoran compound having the formula (I) in the invention as a color forming compound, and bisphenol A, as a developer. Thus-obtained heat-sensitive recording paper can quickly develop color at a lower temperature as compared with the heat-sensitive recording paper obtained by using known Type I-b crystal (FIG. 5). Consequently, Type I-a crystal of the invention is a color forming compound having excellent properties in view of high-speed recording of heat-sensitive recording paper which is strongly desired today.

Further, a heat-sensitive recording paper was prepared by using Type II-a crystal of the fluoran compound having the formula (II) as a color forming compound and bisphenol A as a developer. Uncolored portion of the heat-sensitive recording paper thus obtained was exposed to sunlight for 3 hours and light stability was compared with a heat-sensitive recording paper prepared by using Type II-b crystal. Results are illustrated in Table 2.

TABLE 2

| Crystal | Before exposure | After exposure |
|---|---|---|
| Type II-a crystal | ◯ | ◯ |
| Type II-b crystal | ◯ | X |

Note:
◯ High whiteness is observed.
X Yellowing is found.

As clearly illustrated in Table 2, Type II -a crystal of the invention are excellent as compared with conventionally known Type II -b crystal.

The present invention will hereinafter be illustrated further in detail by way of examples. However, these examples are not intended to limit the scope of the invention.

EXAMPLE 1

Preparation of Type I -a crystal of the inventions

After dissolving 94 g of 2-(4'-N-n-butyl-N-ethylamino-2'-hydroxybenzoyl)benzoic acid [the compound of the formula (III)] in 550 g of concentrated sulfuric acid at 10°~15° C., 59 g of 4-methoxy-2-methyldiphenylamine [the compound of the formula (IV), R=CH₃] was added at the same temperature and stirred for 24 hours at 10°~15° C. The reaction mixture was poured into 3000 ml of ice water. Precipitated solid was filtered and washed with water. The solid was added to 1000 ml of a 10 % aqueous sodium hydroxide solution, 1000 ml of toluene was added, and the resulting mixture was stirred for 2 hours at 60°~70° C. The toluene layer was separated and washed with warm water until washing water became neutral. Toluene layer was separated and 800 ml of toluene was distilled off at 40° C. under reduced pressure. The residue was allowed to stand at room temperature. Precipitated crystal was filtered, washed with a small amount of toluene, further washed with methanol and dried at 60° C. for 24 hours to obtain 125 g of almost colorless crystal. Melting point was 162°-164° C. Powder X-ray diffraction diagram of the crystal is illustrated in FIG. 1.

EXAMPLE 2

Preparation of Type I -a crystal of the Invention

After dissolving 94 g of 2-(4'-N-n-butyl-N-ethylamino-2'-hydroxybenzoyl)benzoic acid in 550 g of concentrated sulfuric acid at 10°~15° C., 59 of 4-methoxy-2-methyl-diphenylamine was added at the same temperature and stirred for 24 hours at 10- 15 The reaction mixture was poured into 3000 mi of ice water. Precipitated solid was filtered and washed with water. The solid was added to 1000 me of a 10 % aqueous sodium hydroxide solution, 1000 mr of toluene was added, and the resulting mixture was stirred for 2 hours at 60°~70° C. Thd toluene layer was separated and washed with warm water until washing water became neutral. Toluene layer was separated and toluene was distilled off at 40° C. under reduced pressure. The residue was a viscous oil. To the residue, 200 g of toluene and 300 g of methanol were added and the resultant mixture was allowed to stand at room temperature. Precipitated crystal was filtered, washed with methanol and dried at 60° C. for 24 hours to obtain 130 g of almost colorless crystal. Melting point was 162° ~164° C. The crystal had an X-ray diffraction diagram illustrated in FIG. 1.

EXAMPLE 3

Preparation of Type I -a, crystal of the Invention

The same procedures as described in Example 1 were carried out except that toluene was replaced by benzene. Crystal was obtained. Melting point was 162°~164° C. The crystal had an X-ray diffraction diagram illustrated in FIG. 1.

EXAMPLE 4

Preparation of Type I -a crystal of the Invention

The same procedures as described in Example 1 were carried out except that toluene was replaced by a mixed xylene. Crystal was obtained. Melting point was 162°~1642° C. The crystal had an X-ray diffraction diagram illustrated in FIG. 1.

EXAMPLE 5

Preparation of Type I -a crystal of the invention

The same procedures as described in Example 1 were carried out except that toluene was replaced by ethylbenzene. Crystal was obtained. Melting point was 162°~164° C. The crystal had an X-ray diffraction diagram illustrated in FIG. 1.

EXAMPLE 6

Preparation of Type I -a crystal of the invention

The same procedures as described in Example 1 were carried out except that toluene was replaced by chlorobenzene. Crystal was obtained. Melting point was 162°~164° C. The crystal had an X-ray diffraction diagram illustrated in FIG. 1.

REFERENCE EXAMPLE 1

Preparation of conventionally known Type I -b crystal

After dissolving 9.4 g of 2-(4'-N-n-butyl-N-ethylamino-2'-hydroxybenzoyl)benzoic acid in 55 g of concentrated sulfuric acid at 10°≠15° C., 5.9 g of 4-methoxy-2-methyidiphenylamine was added at the same temperature and stirred for 24 hours at 10°~15° C. The reaction mixture was poured into 300 ml of ice water. Precipitated solid was filtered and washed with water. The solid was added to 100 ml of a 10 % aqueous sodium hydroxide solution and stirred at 60°~70° C. for 2 hours. The solid was filtered, washed with water and dried. The solid thus obtained was recrystallized from 300 me of isopropanol to obtain 12 g of almost colorless crystal@. Melting point was 181°~183° C. Powder X-ray diffraction diagram of the crystal is illustrated in FIG. 2.

REFERENCE EXAMPLE 2

Preparation of conventionally known Type I -b crystal

The same procedures as described in Reference Example 1 were carried out except that isopropanol was replaced by acetonitrile. Crystal was obtained. Melting point was 181°~183° C. The crystal had an X-ray diffraction diagram illustrated in FIG. 2.

REFERENCE EXAMPLE 3

Preparation of conventionally known Type I -b crystal

The same procedures as described in Example 2 were carried out except that 100 g of toluene and 400 g of methanol were added in place of 209 g of toluene and 300 g of methanol. The crystal was obtained. Melting point was 181°~183° C. The crystal had an X-ray diffraction diagram illustrated in FIG. 2.

EXAMPLE 7

Preparation of Type I -a crystal from Type I -b crystal

After heat-dissolving 10 g of Type I -b crystal in 300 ml of toluene, the solution was cooled to room temperature and allowed to stand. Precipitated crystal was filtered and dried at 60° C. for 24 hours to obtain 9 g of almost colorless crystal. Melting point was 162°~164° C. The crystal had an X-ray diffraction diagram of FIG. 1.

EXAMPLE 8

Preparation of Type I -a crystal from Type I -b crystal

The same procedures as described in Example 7 were carried out except that toluene was replaced by mixed xylene. Crystal was obtained. Melting point was 162°-164° C. The crystal had an X-ray diffraction diagram illustrated in FIG. 1.

EXAMPLE 9

Preparation of Type I -a crystal from Type I -b crystal

The same procedures as described in Example 7 were carried out except that toluene was replaced by chlorobenzene. Crystal was obtained. Melting point was 162°-164° C. The crystal had an X-ray diffraction diagram illustrated in FIG. 1.

Example 10

Preparation of Type I -a crystal from Type -b crystal

The same procedures as described in Example 7 were carried out except that toluene was replaced by o-dichlorobenzene. Crystal was obtained. Melting point was 162°-164° C. The crystal had an X-ray diffraction diagram illustrated in FIG. 1.

EXAMPLE 11

Preparation of Type II -a crystal of the invention

After dissolving 100 g of 2-(4'-N-cyclohexyl-N-n-amylamino-2'-hydroxybenzoyl)benzoic acid [the compound of the formula (V)] in 460 g of concentrated sulfuric acid at 10°-15° C., 53 g of 4-methoxy-2-methyldiphenylamine was added at the same temperature and stirred for 24 hours at 10°-15° C. The reaction mixture was poured into 3000 ml of ice water. Precipitated solid was filtered and washed with water. The solid thus obtained was added to 1000 ml of a 10 % aqueous sodium hydroxide solution. Further, 1000 ml of toluene was added to the mixture and stirred for 2 hours at 60°~70° C. The toluene layer was separated and washed with water until washing water became neutral. The toluene layer was separated and toluene was distilled off at 40° C. under reduced pressure. The residual oil was mixed with 300 ml of isopropanol, stirred at 60° C. for an hour and cooled to the room temperature. Precipitated crystal was filtered, washed with isopropanol and dried at 60° C. for 24 hours to obtain 110 g of almost colorless crystal. Melting point 168°18 171° C. Powder X-ray diffraction diagram of the crystal is illustrated in FIG. 3.

EXAMPLE 12

Preparation of Type II -a crystal of the invention

The same procedures as described in Example 11 were carried out except that isopropanol was replaced by n-butanol. Crystal was obtained. Melting point was 168°~171° C. The crystal had an X-ray diffraction diagram illustrated in FIG. 3.

EXAMPLE 13

Preparation of Type II -a crystal of the invention

The same procedures as described in Example 11 were carried out except that isopropanol was replaced by n-pentanol. Crystal was obtained. Melting point was 168°~171° C. The crystal had an X-ray diffraction diagram illustrated in FIG. 3.

EXAMPLE 14

Preparation of Type II -a crystal of the invention

The same procedures as described in Example 11 were carried out except that isopropanol was replaced by n-hexanol. Crystal was obtained. Melting point was 168°~171° C. The crystal had an X-ray diffraction diagram illustrated in FIG. 3.

Example 15

Preparation of Type II -a crystal of the invention

The same procedures as described in Example 11 were carried out except that isopropanol was replaced by n-octanol. Crystal was obtained. Melting point was 168°~171° C. The crystal had an X-ray diffraction diagram illustrated in FIG. 3.

EXAMPLE 16

Preparation of Type II -a crystal of the invention

The same procedures as described in Example 11 were carried out except that isopropanol was replaced by n-decanol. Crystal was obtained. Melting point was 168°~171° C. The crystal had an X-ray diffraction diagram illustrated in FIG. 3.

EXAMPLE 17

Preparation of Type II -a crystal of the invention

The same procedures as described in Example 11 were carried out except that isopropanol was replaced by a mixture of isopropanol (250 g) and toluene (50 g). Crystal was obtained. Melting point was 168°~171° C. The crystal had an X-ray diffraction diagram illustrated in FIG. 3.

REFERENCE EXAMPLE 4

Preparation of Type II -b crystal according to Japanese Laid-Open Patent SHO 60-35053(1985)

After dissolving 12.3 g of 2-(4'-N-Cyclohexyl-N-n-amylamino-2'-hydroxybenzoyl)benzoic acid in 100 g of 98% sulfuric acid at 20° C., 7.1 g of 4-methoxy-2-methyldiphenylamine was added at 0°~5° C. and reacted at the same temperature for 2 hours, at 20°~30° C. for 24 hours and further 40 hours. The reaction mixture was poured into 500 ml of ice water and adjusted to PH 7~8 by the addition of a 10 % aqueous sodium hydroxide solution. The precipitate was filtered and mixed with 400 ml of toluene and 200 ml of a 10 % aqueous sodium hydroxide solution. After refluxing the mixture for 2 hours with stirring, toluene layer was separated, washed with water and concentrated. Precipitated crystal was filtered and dried to obtain 13.1 g of light brown crystal. Melting was 136°~141° C. Powder X-ray diffraction diagram of the crystal is shown in FIG. 4.

REFERENCE EXAMPLE 5

Preparation of Type II -b crystal

After dissolving 33 g of 2-(4'-N-cyclohexyl-N-n-amylamino-2'-hydroxybenzoyl)benzoic acid in 150 g of 98% sulfuric acid at 10°~15° C., 17.5 g of 4-methoxy-2-methyldiphenylamine was added at the same temperarture and stirred for 24 hours at 10°~15° C. The reaction mixture was poured into 1000 ml of ice water. Precipitated solid was filtered and washed with water. The solid was added to 300 mg of a 10 % aqueous sodium hydroxide solution, 330 ml of toluene was added, and the resulting mixture was stirred for 2 hours at 60°~70° C. The toluene layer was separated and washed with warm water until washing water became neutral. Toluene layer was separated and 800 ml of toluene was distilled off at 40° C. under reduced pressure. The residue was a viscous oil. To the residual viscous oil, 200 ml of methanol was added. Precipitated crystal was filtered, washed with a small amount of methanol, and dried at 60° C. for 24 hours to obtain 28 g of light brown crystal. Melting point was 136°~141° C. The crystal had an X-ray diffraction diagram shown in FIG. 4.

REFERENCE EXAMPLE 6

Preparation of Type II -b crystal

The same procedures as described in Reference Example 5 were carried out except that methanol was replaced by ethanol. Crystal obtained was 27 g. melting point was 136°~141° C. The crystal had an X-ray diffraction diagram illustrated in FIG. 4.

REFERENCE EXAMPLE 7

Preparation of Type II -b crystal

The same procedures as described in Reference Example 5 were carried out except that methanol was replaced by acetonitrile. Crystal obtained was 27 g. melting point was 136°~141° C. The crystal had an X-ray diffraction diagram illustrated in FIG. 4.

EXAMPLE 18

Preparation of Type II -a crystal from Type II -b crystal

A solution obtained by heat-dissolving 10 g of Type II -b crystal in 150 ml of isopropanol was cooled to the room temperature. Precipitated crystal was filtered arid dried at 60° C. for 24 hours to obtain 9 g of almost colorless crystal. melting point was 168°~171° C. The crystal had an X-ray diffraction diagram shown in FIG. 3.

EXAMPLE 19 (Preparation of Type II -a crystal from Type II -b crystal

A solution obtained by heat-dissolving 10 g of Type 11 -b crystal in 80 ml of n-butanol was cooled to the room temperature. Precipitated crystal was filtered and dried at 60° C. for 40 hours to obtain 9 g of almost colorless crystal. Melting point was 168°~171° C.

The crystal had an X-ray diffraction diagram illustrated in FIG. 3.

EXAMPLE 20

Preparation of Type II -a crystal from Type II -b crystal

The crystal of the invention was prepared by carrying out the same procedures as described in Example 19 except that n-butanol was replaced by n-heptanol. Melting point was 168°~171° C. The crystal had an X-ray diffraction diagram illustrated in FIG. 3.

EXAMPLE 21

Preparation of Type II -a crystal from Type II -b crystal

The crystal of the invention was prepared by carrying out the same procedures as described in Example 19 except that n-butanol was replaced by n-nonanol. Melting point was 168°~171° C. The crystal had an X-ray diffraction diagram illustrated in FIG. 3.

EXAMPLE 22

Preparation of Type II -a crystal from Type II -b crystal

The crystal of the invention was prepared by carrying out the same procedures as described in Example 19 except that n-butanol was replaced by n-undecanol. Melting point was 168°~171° C. The crystal had an X-ray diffraction diagram illustrated in FIG. 3.

EXAMPLE 23

Preparation of Type II -a crystal from Type II -b crystal

The crystal of the invention was prepared by carrying out the same procedures as described in Example 19 except that n-butanol was replaced by n-dodecanol. Melting point was 168°~171° C. The crystal had an X-ray diffraction diagram illustrated in FIG. 3.

EXAMPLE 24

Preparation of heat-sensitive recording paper by using Type I -a, crystal of the invention A mixture of 10 g of Type I -a crystal of the invention, 5 g of a 10 % aqueous polyvinyl alcohol solution and 37.5 g of water was pulverized to a particle size of 1.5 g m with a sand mill. Separately bisphenol A was dispersed by the similar manner to obtain a 38 % dispersion of developer.

Then 65.8 g of the developer dispersion, 50 g of the above aqueous dispersion of the Type I -a crystal, 18.3 g of a 60 % aqueous precipitated calcium carbonate dispersion, 88 g of a 10 % aqueous polyvinyl alcohol solution and 51.9 g of water were mixed.

The mixture thus obtained was applied to a white base paper with a wire rod No. 10 and air dried at the room temperature. The resulting heat-sensitive recording paper had very high whiteness without soil. The heat-sensitive recording paper developed very quickly a slightly reddish black color by heating.

Color density characteristics against temperature were measured on the heat-sensitive recording paper with a temperature gradient tester (RHODIACETA). Results are illustrated in FIG. 5. Color density was measured with a Macbeth reflection densitometers Model TR-524. Larger value indicates higher density of developed color.

REFERENCE EXAMPLE 8

Preparation of heat-sensitive recording paper by using conventionally known Type I -b crystal Heat-sensitive recording paper was prepared by carrying out the same procedures as described in Example 24 except that Type I -a crystal of the invention was replaced by conventionally known Type I -b crystal.

Color density characteristics against temperature were measured on the heat-sensitive recording paper with a temperature gradient tester. Result are illustrated in FIG. 5.

EXAMPLE 25

Preparation of pressure-sensitive recording paper by using Type i -a crystal of the invention Coated Back(CB) sheet and Coated Front(CF) sheet were prepared by the following procedures.

A mixture of 100 g of a 10 % aqueous solution of ethylenemaleic anhydride copolymer and 240 g of water was adjusted to pH 4.0 with a 10 % sodium hydroxide solution and mixed with 200 g of a solution containing 5 % by weight of Type I -a crystal of the invention in phenylxylyiethane, SAS-296 (Trade mark of Nippon Petrochemical). After emulsifying the resultant mixture with a homomixer, 60 g of aqueous methylolmelamind solution having a solid content of 50 %, URAMINE T-30 (Trade mark of Mitsui Toatsu Chemicals), was added and stirred at 55° C. for 3 hours to obtain a microcapsule dispersion having an average particle size of 5.0 μm.

To 100 g of the microcapsule dispersion, 4.0 g of wheat starch, 20 g of 20 % paste of oxydized starch and 116 g of water were added, and dispersed. The dispersion thus obtained was applied to a paper having a basis weight of 40 g/M² so as to obtain a coating weight of 5 g/m² as solid. CB sheet was thus obtained.

On the other hand, in order to prepare CF sheet, zinc salt of substituted salicylic acid-styrene copolymer was pulverized in water with a sand grinding mill in the presence of a small amount of a high molecular weight anionic surfactant to obtain an aqueous dispersion containing 40 % by weight of solid. Using the aqueous dispersion, a coating compound (30 % solid content) having the below described composition was prepared and applied to a wood free paper having a basis weight of 40 9/ m² so as to obtain a coating weight of 5.5 g/m² Thus CF sheet was obtained.

| Composition of aqueous coating compound | Weight of solid (g) |
| --- | --- |
| Precipitated calcium carbonate | 100 |
| Developer | 20 |
| Adhesive (Oxidized starch) | 8 |
| Adhesive (Synthetic latex) | 8 |

The microcapsule coated CB sheet and the developer coated CF sheet were overlapped so as to bring both coated surfaces into contact with each other. When pressure was applied on the overlapped sheets with a pencil, raddish black image was emerged on the developer coated surface.

The developed color image had practically no problem on the resistance to light, moisture and No,.

EXAMPLE 26

Preparation of heat-sensitive recording paper by using Type II -a crystal of the invention A mixture of 10 g of Type II -a crystal of the invention, 5 g of a 10 % aqueous polyvinyl alcohol solution and 37.5 g of water was pulverized to a particle size of 1.5 μm with a sand mill. Separately bisphenol A was dispersed by the similar manner to obtain a 38 % dispersion of developer.

Then 65.8 g of the developer dispersion, 50 g of the above aqueous dispersion of the Type II -a crystal, 18.3 g of a 60 % aqueous precipitated calcium carbonate dispersion, 88 g of a 10 % aqueous polyvinyl alcohol solution and 51.9 g of water were mixed.

The mixture thus obtained was applied to a white base paper with a wire rod No. 10 and air dried at the room temperature. The resulting heat-sensitive recording paper had very high whiteness without soil. The heat-sensitive recording paper developed very quickly a slightly reddish black color by heating.

Uncolored portion of the heat-sensitive recording paper was exposed to sunlight for 3 hours. The portion maintained high whiteness without yellowing as illustrated in Table 2.

REFERENCE EXAMPLE 9

Preparation of heat-sensitive recording paper by using conventionally known Type II -b crystal Heat-sensitive recording paper was prepared by carrying out the same procedures as described in Example 26 except that Type II -a crystal of the invention was replaced by conventionally known Type II -b crystal. Uncolored portion of the heat-sensitive recording paper was exposed to sunlight for 3 hours. The portion developed yellowing as illustrated in Table 2.

EXAMPLE 27

Preparation of pressure-sensitive recording paper by using Type II -a crystal of the invention CB sheet and CF sheet were prepared by the following procedures.

A mixture of 100 g of a 10 % aqueous solution of ethylenemaleic anhydride copolymer and 240 g of water was adjusted to pH 4.0 with a 10 % sodium hydroxide solution and mixed with 200 g of a solution containing 5 % by weight of Type II -a crystal of the invention in phenylxylylethane, SAS-296 (Trade mark of Nippon Petrochemical). After emulsifying the resultant mixture with a homomixer, 60 g of an aqueous methylolmelamine solution having a solid content of 50 URAMINE T-30 (Trade mark of Mitsui Toatsu Chemicals), was added and stirred at 55° C. for 3 hours to obtain a microcapsule dispersion having an average particle size of 5.0 g m.

To 100 g of the microcapsule dispersion, 4.0 g of wheat starch, 20 g of 20 % paste of oxydized starch and 116 g of water were added and dispersed. The dispersion thus obtained was applied to a paper having a basis weight of 40 g/m² so as to obtain a coating weight of 5 g/m² as solid. CB sheet was thus obtained.

On the other hand, in order to prepare CF sheet, zinc salt of substituted salicylic acid-styrene copolymer was pulverized in water with a sand grinding mill in the presence of a small amount of a high molecular weight anionic surfactant to obtain an aqueous dispersion containing 40 % by weight of solid. Using the anxious dispersion, a coating compound (30 % solid content) having the below described composition was prepared and applied to a wood free paper having a basis weight of 40 g/ m² so as to obtain a coating weight of 5.5 g/m² Thus CF sheet was obtained.

| Composition of aqueous coating compound | Weight of solid (g) |
| --- | --- |
| Precipitated calcium carbonate | 100 |
| Developer | 20 |
| Adhesive (Oxidized starch) | 8 |

| Composition of aqueous coating compound | Weight of solid (g) |
|---|---|
| Adhesive (Synthetic latex) | 8 |

The microcapsule coated CB sheet and the developer coated CF sheet were overlapped so as to bring both coated surfaces into contact with each other. When pressure was applied on the overlapped sheets with a pencil, reddish black image was emerged on the developer coated surface. The developed color image had practically no problem on the resistance to light, moisture and $No_x$.

What is claimed is:

1. A recording material comprising a support having at least one layer thereon containing a color forming compound and at least one same or different layer thereon containing a developer, wherein said color forming compound is the crystalline form of a fluoran compound having the formula (I):

and exhibiting high peaks at diffraction angle ($2\theta$) of 7.5° and 17.0° and relatively high peaks at diffraction angle ($2\theta$) of 15.1°, 19.1°, 21.5° and 25.3° in an X-ray diffraction diagram by the Cu-K$\alpha$ beam.

2. A recording material comprising a support having at least one layer thereon containing a color forming compound and at least one same or different layer thereon containing a developer, wherein said color forming compound is the crystalline form of a fluoran compound having the formula (II):

and exhibiting high peaks at diffraction angle ($2\theta$) of 5.5° and 19.2° in an X-ray diffraction diagram by the Cu-K$\alpha$ beam.

3. A recording material of claim 1, which is a pressure-sensitive or a heat-sensitive recording material.

4. A recording material of claim 2, which is a pressure-sensitive or a heat-sensitive recording material.

* * * * *